(12) United States Patent
Weitenberg et al.

(10) Patent No.: US 10,188,030 B2
(45) Date of Patent: Jan. 29, 2019

(54) CUTTING MECHANISM FOR WHOLE PLANT HARVESTING

(71) Applicant: DEERE & COMPANY, Moline, IL (US)

(72) Inventors: Clemens Weitenberg, Borken (DE);
Jan-Dirk Schild, Coesfeld (DE);
Gregor Sueck, Stadtlohn (DE); Leo Schulze Hockenbeck, Everswinkel (DE); Daniel Gevers, Gescher (DE);
Martin Huening, Billerbeck (DE);
Bernd-Clint Hungerhoff, Borken (DE);
Juergen Effsing, Ahaus (DE)

(73) Assignee: DEERE & COMPANY, Moline, IL (US)

( * ) Notice: Subject to any disclaimer, the term of this patent is extended or adjusted under 35 U.S.C. 154(b) by 294 days.

(21) Appl. No.: 15/099,251

(22) Filed: Apr. 14, 2016

(65) Prior Publication Data

US 2016/0330904 A1    Nov. 17, 2016

(30) Foreign Application Priority Data

Apr. 16, 2015   (DE) .................. 10 2015 206 845

(51) Int. Cl.
*A01D 34/66*        (2006.01)
*A01B 73/04*        (2006.01)
(Continued)

(52) U.S. Cl.
CPC .......... *A01D 34/664* (2013.01); *A01B 73/044* (2013.01); *A01D 43/081* (2013.01);
(Continued)

(58) Field of Classification Search
CPC .... A01D 34/01; A01D 34/404; A01D 34/408; A01D 34/412; A01D 34/63; A01D 34/64;
(Continued)

(56) References Cited

U.S. PATENT DOCUMENTS

| 3,468,107 | A | * | 9/1969 | Van Der Lely | ...... A01D 41/144 56/11.9 |
| 3,950,923 | A | * | 4/1976 | Martensen | ........... A01D 34/668 56/6 |

(Continued)

FOREIGN PATENT DOCUMENTS

| DE | 2900552 A1 | 7/1979 |
| DE | 19523255 A1 | 1/1997 |

(Continued)

*Primary Examiner* — Alicia Torres
*Assistant Examiner* — Adam J Behrens (57) ABSTRACT

A cutting mechanism for the harvesting of whole plants can include a number of mowing elements, which include a lower cutting disk and conveyor rotors located above, two transverse conveyors located in the back, and a delivery conveyor. The cutting disks of the mowing elements work together with a frame-affixed counter-blade and can be driven together with the corresponding conveyor rotors by a shaft. The shafts are driven by a gear arrangement that extends, on the front side, over the width of the cutting mechanism. The frame of the cutting mechanism can include a middle part and lateral parts that are placed so they can swivel, on the middle part, between a horizontal operating position and a raised transporting position.

20 Claims, 4 Drawing Sheets

(51) Int. Cl.
*A01D 57/00* (2006.01)
*A01D 43/08* (2006.01)
*A01D 101/00* (2006.01)

(52) U.S. Cl.
CPC ........... *A01D 43/082* (2013.01); *A01D 57/00* (2013.01); *A01D 2101/00* (2013.01)

(58) Field of Classification Search
CPC .... A01D 34/66; A01D 34/661; A01D 34/662; A01D 34/664; A01D 34/665; A01D 34/667; A01D 43/06; A01D 43/081; A01D 43/082; A01D 43/083; A01D 41/14; A01D 41/144; A01D 45/02; A01D 45/021; A01D 57/00; A01D 57/06; A01D 57/20; A01D 57/22; A01D 2101/00; A01D 73/00–73/067; A01B 73/044
USPC .............................. 56/6, 17.3, 17.4, 190, 255
See application file for complete search history.

(56) References Cited

U.S. PATENT DOCUMENTS

| | | | | |
|---|---|---|---|---|
| 4,183,196 A * | 1/1980 | Oosterling | A01D 34/664 | 56/13.6 |
| 4,207,726 A * | 6/1980 | Lippl | A01D 43/081 | 56/13.4 |
| 4,502,267 A * | 3/1985 | Klinner | A01D 34/66 | 56/13.6 |
| 5,031,391 A * | 7/1991 | Meijering | A01D 34/66 | 56/13.6 |
| 5,605,032 A * | 2/1997 | Gantzer | A01D 43/10 | 56/16.4 B |
| 5,842,330 A * | 12/1998 | Richardson | A01D 34/667 | 56/6 |
| 5,845,472 A * | 12/1998 | Arnold | A01D 41/144 | 56/94 |
| 5,852,922 A * | 12/1998 | Over Behrens | A01D 43/082 | 56/14.7 |
| 5,884,461 A * | 3/1999 | Ungruh | A01D 34/664 | 56/255 |
| 6,374,587 B1 * | 4/2002 | Wubbels | A01D 45/021 | 56/103 |
| 8,020,363 B1 * | 9/2011 | Barnett | A01D 34/665 | 56/17.4 |
| 8,327,612 B2 * | 12/2012 | Van Der Ent | A01D 75/182 | 56/10.3 |
| 8,528,308 B2 * | 9/2013 | Priepke | A01D 75/30 | 172/311 |
| 8,695,316 B2 * | 4/2014 | Pruitt | A01D 34/664 | 56/255 |
| 8,806,844 B2 | 8/2014 | Miller et al. | | |
| 9,775,292 B2 * | 10/2017 | Horning | A01D 45/021 | |
| 2005/0097876 A1 * | 5/2005 | Bruening | A01D 43/082 | 56/51 |
| 2005/0172598 A1 * | 8/2005 | Billard | A01D 43/077 | 56/192 |
| 2005/0229574 A1 * | 10/2005 | Walter | A01D 34/664 | 56/295 |
| 2006/0225396 A1 * | 10/2006 | Rickert | A01D 41/144 | 56/228 |
| 2006/0254240 A1 * | 11/2006 | Krone | A01D 41/144 | 56/16.6 |
| 2007/0101691 A1 * | 5/2007 | Rickert | A01D 43/082 | 56/157 |
| 2011/0005181 A1 * | 1/2011 | Barnett | A01D 34/664 | 56/157 |
| 2011/0154793 A1 * | 6/2011 | Ernst | A01D 57/22 | 56/94 |
| 2012/0174554 A1 * | 7/2012 | Grobmeier | A01D 43/082 | 56/500 |
| 2014/0283493 A1 * | 9/2014 | Barnett | A01D 34/664 | 56/157 |
| 2015/0216121 A1 * | 8/2015 | Roberge | A01D 41/144 | 56/14.7 |

FOREIGN PATENT DOCUMENTS

| | | | | |
|---|---|---|---|---|
| DE | 10116982 A1 | 10/2002 | | |
| DE | 102007038274 B3 | 4/2009 | | |
| DE | 102005004211 A1 * | 8/2016 | | |
| EP | 0552610 A1 * | 7/1993 | ........... A01D 34/664 |
| EP | 0760200 A1 | 3/1997 | | |
| EP | 0882389 A1 * | 12/1998 | ........... A01D 43/082 |
| EP | 0992187 A1 * | 4/2000 | ........... A01B 73/042 |
| EP | 1008291 A1 | 7/2000 | | |
| EP | 1055359 A1 | 11/2000 | | |
| EP | 1609351 A1 | 12/2005 | | |
| EP | 1776855 A1 * | 4/2007 | ........... A01D 34/664 |
| EP | 2695510 A1 | 2/2014 | | |
| EP | 2781148 A1 * | 9/2014 | ........... A01D 43/082 |
| WO | 02056672 A1 | 7/2002 | | |

* cited by examiner

CUTTING MECHANISM FOR WHOLE PLANT HARVESTING

CROSS-REFERENCE TO RELATED APPLICATIONS

Pursuant to 35 USC § 119, this application claims the benefit of and priority to German patent application no. 102015206845.5, filed on Apr. 16, 2015, which is herein incorporated by reference in its entirety.

FIELD OF THE DISCLOSURE

The disclosure relates to a cutting mechanism for whole plant harvesting.

BACKGROUND

For the harvesting of whole plants with a field chopper, essentially two types of harvesting attachments are available at present.

On the one hand, cutting mechanisms for cuttings are used as harvesting attachments ahead of field choppers, so as to cut off relatively soft plants which are not excessively large, such as grass and unripe cereal, and to take them to the field chopper, in which they are chopped and transferred to the transporting vehicle. As a rule, the chopped plants are used as whole plant silage for the feeding of cattle or they are used in biogas systems. Such cutting mechanisms for cuttings usually comprise a number of mowing drums or mowing disks, which are arranged laterally, next to one another, for the cutting off of crops, and a transverse conveyor in the rear, which conveys the crops to the middle of the cutting mechanism for cuttings, and from there they are taken by a delivery conveyor to the rear and to the intake channel of the field chopper. As a rule, the driving of the mowing drums or mowing disks is carried out by gears located on the front side of the cutting mechanism for cuttings, which extend, as with mowing mechanisms—see U.S. Pat. No. 8,695,316 B2—on the front side of the cutting mechanism in the transverse direction. The transverse conveyor is usually a screw conveyor whose middle area is used as a delivery conveyor (U.S. Pat. No. 8,806,844 B2), or belt conveyors are used as transverse and delivery conveyors (DE 101 16 982 A1), as are, in fact, also used in cereal cutting mechanisms (see EP 1 055 359 A1).

On the other hand, one uses so-called corn mowing attachments or teeth as harvesting attachments ahead of field choppers, in order to harvest larger, stalk-like plants, especially corn, which can reach considerable heights of several meters. The corn mowing attachments usually comprise mowing and intake drums with lower cutting disks for the cutting off of the plants from the stubbles remaining in the ground, and overhead conveyor drums to remove the plants. The transverse transport takes place with separate transverse conveyors in the form of screw conveyors or belt conveyors (see, for example, DE 29 00 552 A1, DE 195 23 255 A1, or EP 1 008 291 A1), which are used as delivery conveyors, or with the backs of the mowing and intake drums, together with separate transverse conveyor drums and delivery conveyor drums (see EP 0 760 200 A1). The cutting disks cut the stems free and are therefore operated at a higher rotating speed than the conveyor drums, or they work together with stationary counter blades (see DE 10 2007 038 274 A1). The driving of the mowing and intake drums usually takes place with corresponding gears, which are driven by a shaft located in a transverse carrier.

Furthermore, in the state of the art, cutting mechanisms for cuttings are provided with rigid frames, that is, they cannot be folded into a transporting position, but rather are placed, as a whole, on a transport trailer, so as to pull them along, during transport, on a road behind the field chopper. Thus, a lot of time is lost in the attaching and detaching of the cutting mechanism for cuttings on the field chopper. Analogous statements are also valid for cereal cutting mechanisms with transverse conveyor belts, whose lateral parts can, in any case, be folded up manually for maintenance purposes (EP 2 695 510 A1). Even if the lateral parts would swivel up with the transverse belt conveyors, the attainable operating width would be rather limited: since the middle part with the delivery conveyor for conveying to the rear is relatively narrow, the wider lateral parts cannot be placed flat above the middle part. They can only be swiveled upward by 90°, which with larger widths of the lateral parts (and thus larger vertical dimensions in the transporting position) causes an operating width-limiting view restriction for the operator of the harvesting machine.

The corn mowing attachments are therefore structured in a relatively cumbersome manner—among other things, because each mowing and intake drum is provided with its own gear, including a corresponding housing. The cutting mechanism for the cuttings have, on the other hand, a simpler and lighter structure, but are also not suitable for the harvesting of excessively high plants. With expected climate changes, which lead to reduced precipitation, one can expect that, in certain areas of the world, increasingly, plants will be grown that can survive with relatively small amounts of water and are therefore not as large as corn, but nevertheless are too large to be harvested with a normal cutting mechanism for cuttings.

SUMMARY

An object of the disclosure under consideration is to make available a cutting mechanism for whole plant harvesting, which has a less cumbersome structure than a corn attachment, but which, nevertheless, is suitable for the harvesting of larger plants.

According to another object of the disclosure, a cutting mechanism for the harvesting of whole plants is to be made available, which can be brought to a compact transporting position.

According to a first aspect of the disclosure, a cutting mechanism for the harvesting of whole plants comprises a frame that extends transverse to a forward direction, a number of mowing elements that are distributed on the front side of the cutting mechanism over its width, which can be made to rotate around the high axis; the mowing elements comprise a lower cutting disk for the cutting off of crops from the ground, and conveyor rotors that are located above the cutting disk, with the rotors rotated backward around rotating axes, coaxial to the cutting disk, and two transverse conveyors located on the sides of the cutting mechanism, which are set up to convey, to the middle of the cutting mechanism, crops cut off by the mowing elements in front, in the forward direction, independent of the back sides of the mowing elements, where they can be conveyed by a rear delivery opening of the cutting mechanism, which is also set up to convey away crops cut off by the mowing elements located ahead of the delivery conveyor. The lower cutting disks of the mowing elements work together, in each case, with a counter-blade, stationary in a frame, and can be driven together with the corresponding conveyor rotors. The shafts of the mowing elements can be driven by a gear arrangement that extends, on the front side, over the width of the cutting mechanism.

In other words, a gear arrangement that extends, on the front side, over the width of the cutting mechanism is used to drive the mowing elements, as is the case with mowing mechanisms and cutting mechanisms for cuttings. Since the latter have lower cutting disks that work together with stationary counter-blades, a separate drive is superfluous for the lower cutting disks, which makes available a substantially higher rpm, in comparison with the conveyor rotors, as is otherwise required for a free cut. The cutting disks are driven here at the rpm at which the conveyor rotors of the mowing elements are also driven. The conveyor rotors and cutting disks can be driven with a single common shaft by the gear arrangement. The removal of the plants is carried out by separate transverse conveyors and a middle delivery conveyor, so that the mowing elements are not used for the transverse transporting of the plants and need not be also dimensioned for this in their dimensions and rpm. In this way, one obtains a cutting mechanism with a relatively simple structure for whole plant harvesting, with which—among other things, as a result of the use of cutting disks with conveyor rotors located above, instead of the simple mowing disks or mowing drums of previous cutting mechanisms for cuttings—plants larger than grass and cereals can also be harvested.

In particular, the frame comprises a middle part and lateral parts that are placed so they can swivel on the middle part between a horizontal operating position and a raised transporting position. The middle part and the lateral parts are correlated with sections of the gear arrangement. In the transporting position, the lateral parts can lie layered, like a sandwich, above one another.

According to a second aspect of the disclosure, a cutting mechanism for the harvesting of whole plants comprises a frame extending transverse to a forward direction, a number of mowing elements for the cutting off of crops, distributed on the front side of the cutting mechanism over its width, and two transverse conveyors that are located on the sides of the cutting mechanism and that are set up to convey crops cut off by the mowing elements, located, in front, in the forward direction, to the middle of the cutting mechanism, where they can be conveyed away by a delivery conveyor, which is set up to also convey away the crops cut off by the mowing elements located ahead of the delivery conveyor. The frame has a middle part and lateral parts that are placed so they can swivel on the middle part between a horizontal operating position and a raised transporting position. The transporting conveyors are wider than the lateral parts and can be brought into a position with a reduced width for the swiveling of the lateral parts into the transporting position.

In other words, when the cutting mechanism is to be brought from the operating position to the transporting position, the transverse conveyors are first pushed together into one another. If the transverse conveyor is a belt conveyor, the inner deflection roller is accordingly pushed outward. Analogously, a flexible transverse conveyor screw could be compressed in that its inner end is pushed outward. The transverse conveyor is then approximately as wide as the lateral part and extends within its lateral dimensions. Subsequently, the lateral parts are, simultaneously or one after the other, swiveled upward or inward into the transporting position. In the transporting position, the lateral parts can, in particular, lie layered, sandwich-like, above one another. Thus, in a cutting mechanism with transverse conveyors that are wider than the lateral parts and a relatively narrow delivery conveyor, a compact transporting position is attained. The mowing elements can be structured, as mentioned above, with lower cutting disks and upper conveyor rotors, or there are mowing drums from cutting mechanisms for cuttings or mowing blades that work together with mowing fingers, as they are used on cereal cutting mechanisms.

In particular, the transverse conveyors and/or the delivery conveyor include belt conveyor(s), which lies or lie in the operating position in an essentially horizontal plane.

The conveyor speed of the transverse conveyor and/or the delivery conveyor can be adjusted independently of the rpm of the mowing elements. A direct adaptation of the conveyor speed of the transverse conveyor and/or the delivery conveyor to the conveyor speed of the subsequent intake rollers of a field chopper (see WO 02/056672 A1) or the conveyor speed of the transverse conveyor and/or the delivery conveyor can lie between the conveyor speed of the mowing elements and the conveyor speed of the subsequent intake rollers of a field chopper (see EP 1 609 351 A1).

The conveyor rotors can work together with strippers that are located in a vertical direction between conveyor disks of the conveyor rotor and run bent, in a horizontal direction, in the shape of an arc, to the back and to the middle of the machine. The strippers can follow the vertical walls that are located between adjacent mowing elements.

In one possible embodiment, the conveyor rotors comprise, in a vertical direction, approximately elliptical conveyor disks that are at a distance from one another. The conveyor disks can be connected by spacing rings, below one another, and with the lower cutting disk. The assembly consisting of the conveyor disks, the spacing rings, and the cutting disk can be coupled with the corresponding shaft so that the torque is transferred. The assembly consisting of the conveyor disks, the spacing rings, and the cutting disk can be freely moved on the corresponding shaft in an axial direction so that the force of gravity produces the contact pressure of the cutting disk on the counter-blade. The movement of the assembly can be limited upward by the stripper.

BRIEF DESCRIPTION OF THE DRAWINGS

An embodiment example of the disclosure, described in more detail below, is shown in the drawings, wherein the reference symbols should not be used to limit the interpretation of the patent claims. The figures show the following:

DETAILED DESCRIPTION

Figure 1:
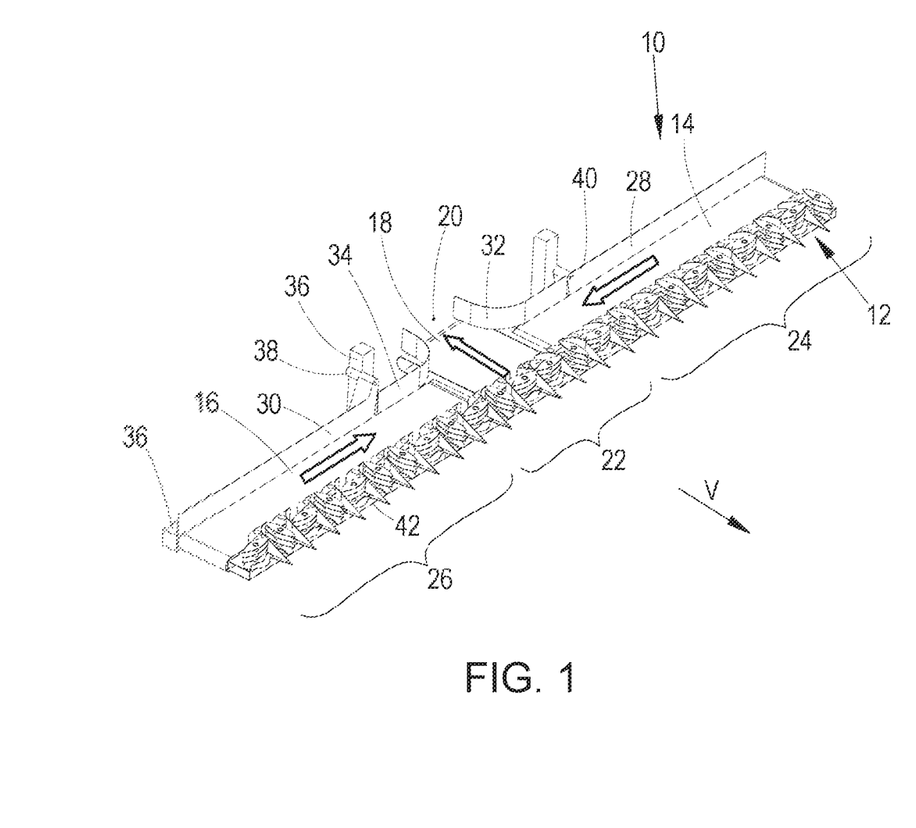
FIG. 1, a perspective view of a cutting mechanism for the harvesting of whole plants, in the operating position.

FIG. 1 shows a perspective view of a cutting mechanism 10 that is particularly suitable for the harvesting of whole plants. The cutting mechanism 10 comprises a number (twenty-four in the embodiment shown) of mowing elements 12, which are arranged laterally, next to each other, and which are used for cutting off plants from the ground when the cutting mechanism 10 is moved in the harvesting operation by a machine (not depicted), which is carrying it in a forward direction V over the ground of a field. The mowing elements 12 deliver the cut-off parts of the plants to the rear, where they are transported by transverse conveyors 14, 16, in the direction of the longitudinal middle plane of the cutting mechanism 10, and finally, are delivered to the rear through a delivery opening 20, using a delivery conveyor 18. They are then grasped either by intake rollers of a field chopper (not depicted) moving the cutting mechanism 10 over the field or, perhaps after a post-processing, for example, being placed by conditioning rollers as a swath on the field in order to be taken up later, in particular, after a drying, by another harvesting machine, for example, a bailing press or a field chopper.

The transverse conveyors 14, 16 are designed as belt conveyors that lie in essentially horizontal planes or planes inclined slightly forward. A foldable frame 36 of the cutting mechanism 10 with swivel axes 38 and 40 comprises a middle part 22, a left lateral part 24 in the forward direction V, and a right lateral part 26 in the forward direction, wherein the lateral parts 24 and 26 can be brought into a compact transporting position by swiveling around the swivel axes 38, 40 by means of non-depicted actuators (in particular, hydraulic cylinders), as is shown later with the aid of FIGS. 3 to 7. To the back of the transverse conveyors 14, 16, there are rear walls 28, 30 of the lateral parts 24, 26, where rear walls 32, 34 of the middle part 22 follow inward, which are bent to the back, toward the delivery opening 20.

The driving of the transverse conveyors 14, 16 and the delivery conveyor 18 can take place mechanically by means of the machine carrying the cutting mechanism 10 or by correlated hydraulic motors (not depicted), which make possible an adjustment of the conveyor speed and an adaption to the conveyor speed of the intake rollers of the field chopper carrying the cutting mechanism 10 and thus to the cutting length. In this regard, reference is made to the state of the art according to WO 02/056672 A1 and EP 1 609 351 A1.

The driving of the mowing elements 12 is carried out by a gear arrangement 42, which is placed on the front side of the cutting mechanism 10 and which can take place mechanically with the machine carrying the cutting mechanism 10, or can be driven by correlated hydraulic motors. The gear arrangement 42 comprises three sections, which are respectively correlated with the lateral parts 24, 26 and the middle part 22. In the individual sections of the gear arrangement 42, shafts 52 are correlated with the mowing elements 12, see FIG. 2. The individual shafts 52 are connected with toothed wheels in a known manner that is therefore is not graphically depicted; they are in a drive connection with one another by intermediate toothed wheels. In the operating position, the sections of the gear arrangement 42 can be in a drive connection with one another—for example, by means of meshing toothed wheels or couplings, or the sections are driven separately. The rotating directions of the mowing elements 12 are such that their front sides turn outward during the harvesting operation. Adjacent mowing elements 12 can be staggered by 90°. Holders, which connect the gear arrangement 42 with the back frame 36, can be located between the spans of the belt conveyors of the transverse conveyors 14, 16, which is also analogously valid for the drive of the gear arrangement 42.

Figure 2:
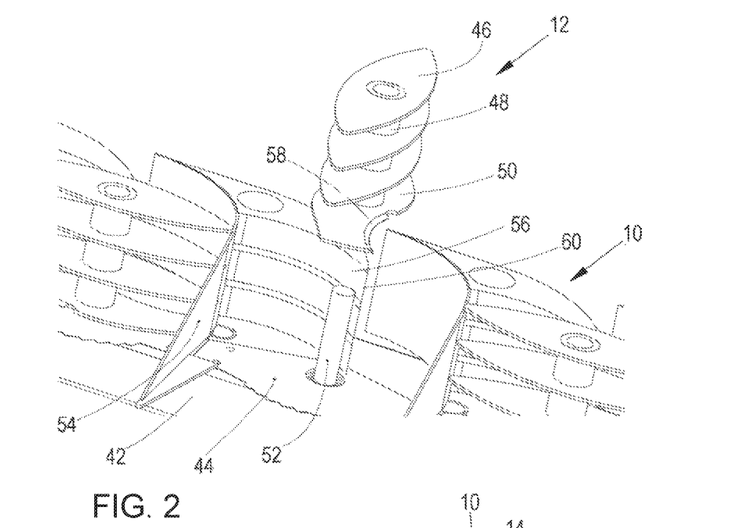
FIG. 2, a perspective, exploded view of a mowing element of the cutting mechanism of FIG. 1.

FIG. 2 shows an individual mowing element 12 in an enlarged, exploded view. The mowing element 12 is composed of a lower cutting disk 50 and conveyor rotors that are coaxially arranged over it; in the embodiment shown, they comprise three conveyor disks, located above one another. The conveyor disks 46 are connected with one another by means of spacing rings 48, and another spacing ring 48 connects the lowermost conveyor disk 46 with the cutting disk 50. The conveyor disks 46 are, in fact, flat, and in a top view have an elliptical or biconvex shape; they accordingly have two carriers, which project outward from the rotational axis and taper outward. The cutting disk 50 is similarly shaped, but with a leading, smoothed cutting edge 58, which is shaped in the form of a sickle (concave). The driving of the mowing element 12 is carried out via the shaft 52 which projects above, upward from the gear arrangement 42; it is coupled, in a torque-fixed manner, with the mowing element 12 by means of non-round features (for example, by an interlocking or a polygonal cross section). The mowing element 12 can be affixed on the shaft 52 in an axial direction, or for the production of the contact pressure between the cutting disk 50 and a stationary, toothed counter-blade 44, placed on the upper side of the gear arrangement 42 and extending forward from there, in the shape of a half-circle, it can sit axially free so it can be moved on the shaft 52.

Vertical walls 54 are located between adjacent mowing elements 12; they extend parallel to the forward direction V in their areas lying in front of the shaft 52 and are used as divider tips. In the back of the shaft 52, the walls 54 are bent in the shape of a circle in the direction of the middle of the cutting mechanism 10, with a radius that is somewhat larger than the envelope circle of the conveyor disks 46 and the cutting disk 50. From the back ends of the walls 54, lug-like, bent strippers 56 extend outward and forward to a front tip 60, which encloses only a narrow gap with the adjacent spacing ring 48. In each case, a stripper 56 is located between two adjacent conveyor disks 46 and in the gap between the lowermost conveyor disk 46 and the cutting disk 50. Since, as a result of the radial dimension of the conveyor disks 46 and the cutting disk 50, the strippers 56 always cover the conveyor disks 46 and the cutting disk 50 in their middle area adjacent to the spacing rings 48 and the tip 60 of the strippers 56, the axial movement of the assembly consisting of the conveyor disks 46, the spacing rings 48, and the cutting disk 50 is very limited in an upward axial direction, so that even when this assembly is pressed upward with a high crop throughput, a collision with the stripper 56 does not occur.

Figure 3:
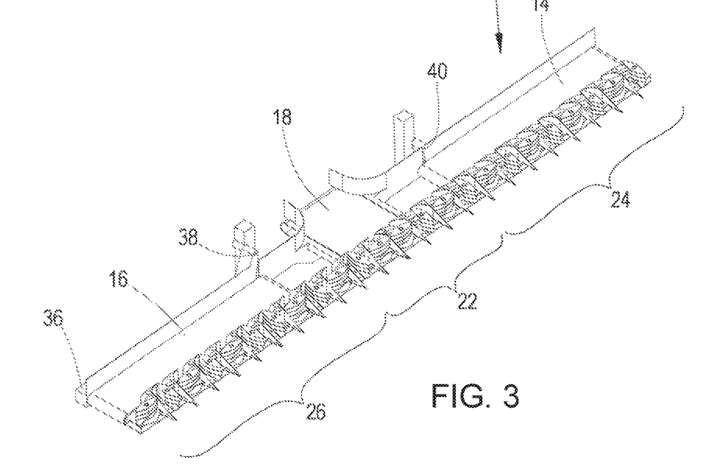
FIG. 3, a perspective view of the cutting mechanism of FIG. 1 with transverse conveyors brought into a position of a reduced width.
Figure 4:
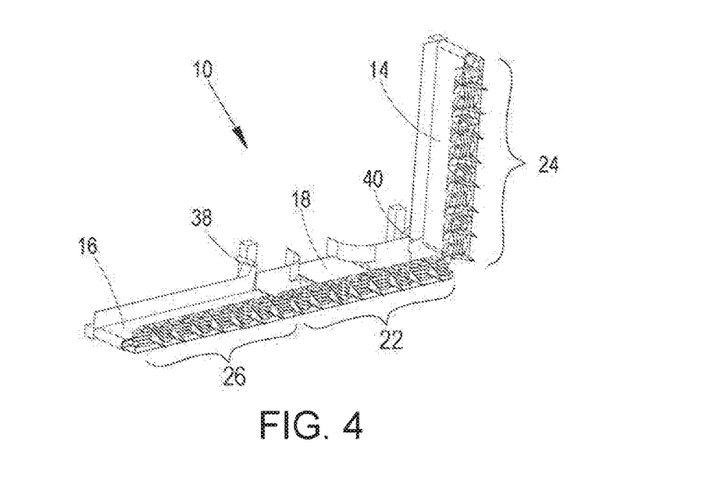
FIG. 4, a perspective view of the cutting mechanism of FIG. 3 with a folded-up first lateral part.
Figure 5:
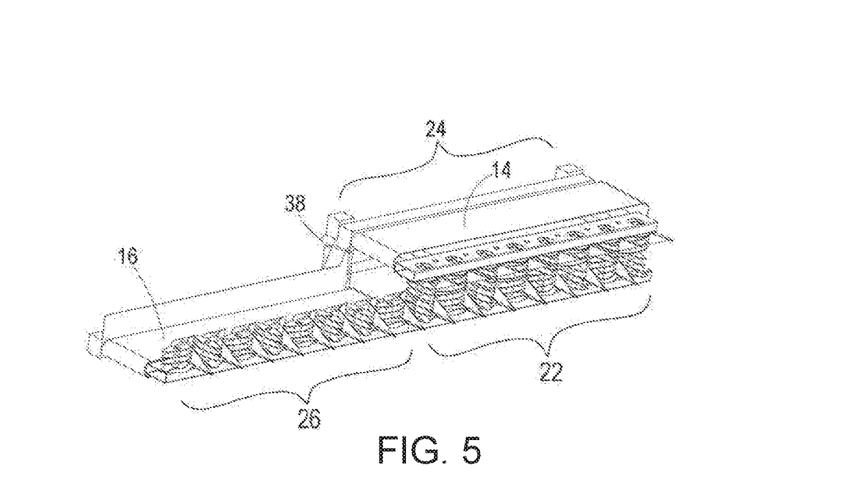
FIG. 5, a perspective view of the cutting mechanism of FIG. 3 with the first lateral part placed over the middle part.
Figure 6:
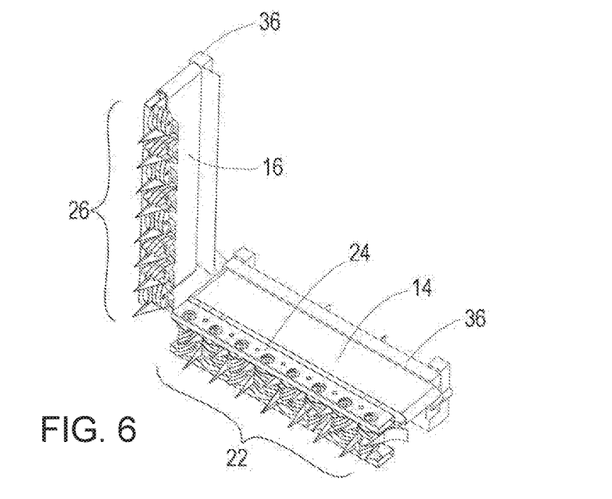
FIG. 6, a perspective view of the cutting mechanism of FIG. 5 with the folded-up second lateral part.
Figure 7:
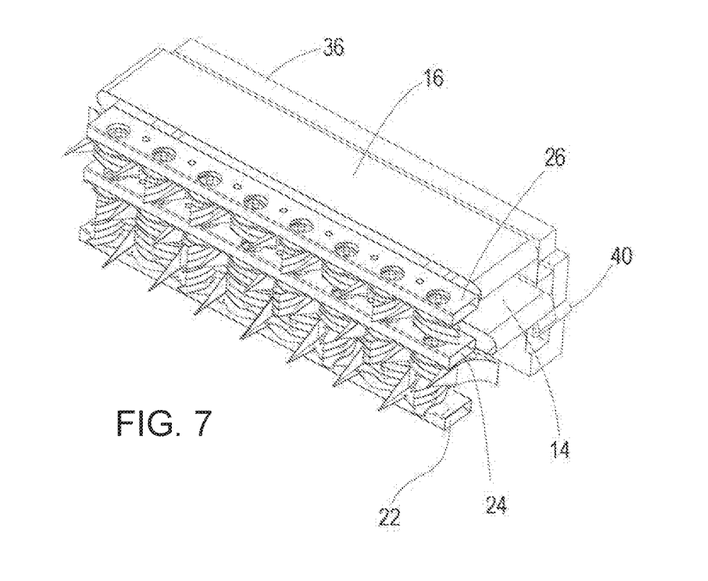
FIG. 7, a perspective view of the cutting mechanism of FIG. 5 with the second lateral part placed over the first lateral part.

For transporting on a road, the cutting mechanism 10 can be brought into a compact transporting position. To this end, as is shown in FIG. 3, the width of the transverse conveyors 14, 16 is first reduced, in that their inner deflection rollers are pushed outward by suitable actuators until transverse conveyors 14 are entirely located within the lateral extension of the lateral parts 24, 26. Subsequently, one of the lateral parts 24 is first swiveled by an actuator upward (see FIG. 4) and inward (see FIG. 5), around the axis 40, until it lies above the middle part 22. At the same time, or afterward (see DE 10 2005 004 211 A1), the other lateral part 26 is swiveled by an actuator upward (see FIG. 6) and inward (see FIG. 7), around the axis 38, until it lies above the now lower lateral part 24 which was first swiveled. The described control of the actuators is carried out, in particular, by an independently operating control in accordance with an operator's input. One could take measures that retract belt conveyors, which are loosely suspended between their deflection rollers in the transporting position, into the lateral parts 24, 26, so that they are not suspended downward on the sides of the cutting mechanism 10, in that they are retracted into the lateral parts 24, 26, for example, by a suitable drive of one of the deflection rollers. The process for the transition from the transporting position into the operating position is carried out in the reverse direction. One thus obtains a compact transporting position of the cutting unit 10, even though the transverse conveyors 14, 16 also extend over the lateral extension of the middle part 22 in the operating position in accordance with FIG. 1. The width of the cutting mechanism 10 can be 9 m, in accordance with the valid regulations, so that the lateral parts 24, 26 and the middle part 22 can be 3 m in width.

As a result, one obtains a relatively simple cutting mechanism 10 for the harvesting of whole plants that is particularly suitable as a harvesting attachment for a field chopper and can also harvest larger plants whose height, for example, is more than 1 m. The mowing elements 12, located ahead of the transverse conveyors 14, 16, work like nonreturn valves and prevent the plants from falling forward from the cutting mechanism 10. The mowing elements 12 have, moreover, a relatively small diameter (for example, ca. 375 mm), so that the plant base is not pushed far outward against the conveyor direction, which is advantageous when the plants are taken up. In this way, the plant does not fall over and it arrives at the transverse conveyance with the base in front, on the transverse belt conveyor, which, moreover, forms a kind of table that takes care that the plants and bulbs no longer readily remain lying on the field.

The independent drives for the mowing elements 12, on the one hand, and the transverse and delivery conveyors 14, 16, 18, on the other hand, permit the transverse and delivery conveyor rate to be adapted to the individual cutting length of the field chopper and, in particular with small cutting heights, to set them at suitable, high values. Such a procedure is hardly possible with previous harvesting attachments (see EP 0 760 200 A1), in which the transverse conveyance also takes place by means of the backs of the mowing drums, as the transverse conveyer speed is limited by the maximum rpm of the mowing drums, in which a problem-free crop acceptance is still possible, and a clear acceleration of the crop flow through the delivery conveyor drum leads to a nonuniform flow of crops in batches. By the independent conveyor rates, accordingly, a better synchronous movement between the cutting mechanism and the intake rollers can be attained, without the taking up of the plants being disadvantageously influenced. Another advantage of the independent conveyor rates is to be found in the individual plants being accelerated immediately after they are taken up by the transverse conveyors 14, 16—that is, always only the individual plants and not the entire crop flow batch, as would be the case with an acceleration only by the deliver conveyor. The crop flow is accordingly evened out.

With the stationary counter-blade 44 and the cutting disks 50 of the mowing elements, there is the possibility of increasing the rotational rate of the mowing elements, in comparison to previous mowing attachments operating in the free cutting, which was limited by the reliable rotational speed of the cutting disks, which rotate faster than the drums. Finally, as a result of the relatively small radial dimensions of the mowing elements with an integrated cutting disk 50, the danger of bending the cutting disks 50 is very low.

The invention claimed is:

1. A cutting mechanism for the harvesting of whole plants, comprising:

a frame, extending transverse to a forward direction;
a plurality of rotatable mowing elements positioned on a front side of the cutting mechanism and distributed over a width of the cutting mechanism, each of the plurality of rotatable mowing elements configured to rotate about a rotational axis and comprising a lower cutting disk configured to cut off crops from the ground and a conveyor rotor located above the lower cutting disk, the conveyor rotor configured to rotate around the rotational axis, coaxial to the cutting disk;
first and second transverse conveyors, located on sides of the cutting mechanism, configured to convey the crops cut off by the mowing elements to a middle of the cutting mechanism; and
a delivery conveyor located in the middle of the cutting mechanism configured to receive crops from the first and second transverse conveyors and convey the crops to a rear delivery opening of the cutting mechanism;
wherein the lower cutting disks of the mowing elements work together with one or more frame-affixed counter-blades and are driven together with the corresponding conveyor rotors by a shaft;
wherein the shafts of the mowing elements are driven by a gear arrangement that extends, on the front side, over the width of the cutting mechanism;
wherein the frame comprises a middle part and first and second lateral parts configured to swivel on the middle part between a horizontal operating position and a raised transporting position; and
wherein the first and second transverse conveyors are wider than the corresponding first and second lateral parts in the horizontal operating position and are within the width of the first and second lateral parts before being raised to the transporting position.

2. The cutting mechanism of claim 1, wherein sections of the gear arrangement are correlated with the middle part and the first and second lateral parts.

3. The cutting mechanism of claim 1, wherein at least one of the first and second transverse conveyors and the delivery conveyor includes a belt conveyor, which, in the operating position, lies in an essentially horizontal plane.

4. The cutting mechanism of claim 1, wherein the conveyor speed of at least one of the first and second transverse conveyors and the delivery conveyor is adjustable independently of a rotational speed of the mowing elements.

5. The cutting mechanism of claim 1, wherein the conveyor rotors comprise one or more conveyor disks spaced apart in a vertical direction from one other and have an approximately elliptical shape.

6. The cutting mechanism of claim 5, wherein the conveyor rotors cooperate with one or more strippers located in a vertical direction between the conveyor disks of the conveyor rotor, the one or more strippers having an arcuate shape in the horizontal direction.

7. The cutting mechanism of claim 6, wherein the one or more strippers follow vertical walls that are located between adjacent mowing elements.

8. The cutting mechanism of claim 5, wherein the one or more conveyor disks are connected to the lower cutting disk by one or more spacing rings, and wherein the one or more conveyor disks, the one or more spacing rings, and the cutting disk are coupled with the corresponding shaft in a torque-transferring manner.

9. The cutting mechanism of claim 8, wherein the one or more conveyor disks, the one or more spacing rings, and the cutting disk are moveable in an axial direction, on the corresponding shaft, and are limited in upward movement by the one or more strippers.

10. A cutting mechanism for the harvesting of whole plants, comprising:
   a frame, extending transverse to a forward direction;
   a plurality of rotatable mowing elements positioned on a front side of the cutting mechanism and distributed over a width of the cutting mechanism, each of the plurality of rotatable mowing elements configured to rotate about a rotational axis and comprising a lower cutting disk configured to cut off crops from the ground and a conveyor rotor located above the lower cutting disk, the conveyor rotor configured to rotate around the rotational axis, coaxial to the cutting disk;
   first and second transverse conveyors, located on sides of the cutting mechanism, configured to convey the crops cut off by the mowing elements to a middle of the cutting mechanism; and
   a delivery conveyor located in the middle of the cutting mechanism configured to receive crops from the first and second transverse conveyors and convey the crops to a rear delivery opening of the cutting mechanism;
   wherein the lower cutting disks of the mowing elements work together with one or more frame-affixed counterblades and are driven together with the corresponding conveyor rotors by a shaft;
   wherein the shafts of the mowing elements are driven by a gear arrangement that extends, on the front side, over the width of the cutting mechanism; and
   wherein the conveyor rotors comprise one or more conveyor disks spaced apart in a vertical direction from one other and have an approximately elliptical shape.

11. The cutting mechanism of claim 10, wherein the conveyor rotors cooperate with one or more strippers located in a vertical direction between the conveyor disks of the conveyor rotor, the one or more strippers having an arcuate shape in the horizontal direction.

12. The cutting mechanism of claim 11, wherein the one or more strippers follow vertical walls that are located between adjacent mowing elements.

13. The cutting mechanism of claim 10, wherein the one or more conveyor disks are connected to the lower cutting disk by one or more spacing rings, and wherein the one or more conveyor disks, the one or more spacing rings, and the cutting disk are coupled with the corresponding shaft in a torque-transferring manner.

14. The cutting mechanism of claim 13, wherein the one or more conveyor disks, the one or more spacing rings, and the cutting disk are moveable in an axial direction, on the corresponding shaft, and are limited in upward movement by the one or more strippers.

15. A cutting mechanism for the harvesting of whole plants, comprising:
   a frame comprising a middle portion and first and second lateral portions extending transverse to a forward direction;
   a plurality of rotatable mowing elements positioned across a width of the frame, each of the plurality of rotatable mowing elements comprising a lower cutting disk and a conveyor rotor located above and coaxial to the lower cutting disk, the conveyor rotor comprising one or more conveyor disks spaced apart from the lower cutting disk in the vertical direction;
   first and second transverse conveyors extending along the corresponding first and second lateral portions; and
   a delivery conveyor located in the middle portion between the first and second transverse conveyors;
   wherein the first and second lateral portions are positioned on either side of the middle portion in a horizontal operating position, and the first and second lateral portions are layered on top of the middle portion in a raised transporting position; and
   wherein the first and second transverse conveyors are wider than the corresponding first and second lateral portions in the horizontal operating position and the first and second transverse conveyors are within the width of the first and second lateral parts in the raised transporting position.

16. The cutting mechanism of claim 15, wherein the one or more conveyor disks are spaced apart in a vertical direction from one other and have an approximately elliptical shape.

17. The cutting mechanism of claim 16, wherein the conveyor rotors cooperate with one or more strippers located in a vertical direction between the conveyor disks of the conveyor rotor, the one or more strippers having an arcuate shape in the horizontal direction.

18. The cutting mechanism of claim 16, wherein the one or more conveyor disks are connected to the lower cutting disk by one or more spacing rings, and wherein the one or more conveyor disks, the one or more spacing rings, and the cutting disk are coupled with the corresponding shaft in a torque-transferring manner.

19. The cutting mechanism of claim 18, wherein the one or more conveyor disks, the one or more spacing rings, and the cutting disk are moveable in an axial direction, on the corresponding shaft, and are limited in upward movement by the one or more strippers.

20. The cutting mechanism of claim 15, wherein a conveyor speed of at least one of the first and second transverse conveyors and the delivery conveyor is adjustable independently of a rotational speed of the mowing elements.

* * * * *